(12) United States Patent
Shih et al.

(10) Patent No.: US 7,166,260 B2
(45) Date of Patent: Jan. 23, 2007

(54) REACTOR FOR PRODUCING ULTRA FINE PARTICLES

(75) Inventors: Ruey-Fwu Shih, Hsinchu (TW); Sheng Yang, Hsinchu (TW); Mu-Jen Young, Hsinchu (TW); Meng-Zhi Ye, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 567 days.

(21) Appl. No.: 10/400,629

(22) Filed: Mar. 28, 2003

(65) Prior Publication Data
US 2004/0057884 A1 Mar. 25, 2004

(30) Foreign Application Priority Data
Sep. 25, 2002 (TW) ............... 91215176 U

(51) Int. Cl.
*B01J 8/08* (2006.01)
*B01F 15/00* (2006.01)

(52) U.S. Cl. ............ 422/215; 422/213; 422/259; 366/168.1; 366/175.1

(58) Field of Classification Search ............ 261/83, 261/88, 89, 94–98, 100–107; 210/787, 788; 422/135, 136, 209, 211, 212, 213, 215, 259; 366/168.1, 175.1
See application file for complete search history.

(56) References Cited

U.S. PATENT DOCUMENTS

| | | | | | |
|---|---|---|---|---|---|
| 4,381,045 | A | * | 4/1983 | Buchwalder | 181/265 |
| 4,692,283 | A | * | 9/1987 | Wem et al. | 261/89 |
| 5,363,909 | A | * | 11/1994 | Acharya et al. | 165/111 |
| 6,022,513 | A | * | 2/2000 | Pecoraro et al. | 423/311 |
| 7,074,353 | B1 | * | 7/2006 | Jachuck et al. | 264/7 |

* cited by examiner

*Primary Examiner*—N. Bhat
(74) *Attorney, Agent, or Firm*—Bacon & Thomas PLLC

(57) ABSTRACT

A reactor containing a plurality of porous rotors is disclosed. A liquid sprayed in a direction from a rotating axis to the rotors is hit by the porous rotors, creating fine liquid particles, so that a mass transfer takes place between the surfaces of the liquid particles and a gas injected into the reactor, and thus a crystallization reaction is initiated. The crystallization reaction is confined by the amounts of the reactants contained in the liquid particles, and will stop as soon as one of the reactants is consumed, so that the resulting crystals can be controlled in nanometer level. The reactor of the present invention is also suitable for use in a liquid-liquid reaction, wherein two different liquids are separately sprayed in a direction from the rotating axis and hit by the porous rotors, and the resulting fine liquid particles of the two different liquids contact and react with each other, so that ultra fine particles are formed.

14 Claims, 2 Drawing Sheets

REACTOR FOR PRODUCING ULTRA FINE PARTICLES

FIELD OF THE INVENTION

The present invention relates to a reactor for producing ultra fine particles, particularly a reactor containing a plurality of porous rotors for producing ultra fine particles.

BACKGROUND OF THE INVENTION

Ultra fine particles, e.g. metal oxides, organic compounds, inorganic compounds, and composite particles, can be used as new materials with high performance in microelectronics, information industry, aviation industry, chemical engineering, mechanical engineering, auto industry, bioengineering, etc. At present, the production of ultra fine particles can be classified into physical methods and chemical methods. Among the chemical methods, the precipitation method is the most common one, where a chemical precipitation reaction takes place in a stirring tank reactor or a mixing kettle reactor and in an ordinary gravitational field. The precipitation method has the following disadvantages: (1) non-uniform distribution of the particle sizes and difficult in controlling the particle size; (2) poor repeatability between batches of product; (3) slow mass transfer, long reaction time, large energy consumption, and low production efficiency. These disadvantages mainly are caused by non-uniform micro-mixing in the reactor, and poor micro-mass-transfer, etc.

U.S. Pat. No. 4,283,255 by Ramshaw, et at. (1981) disclose a technique for performing a mass transfer through a rotation pack bed. This technique is mainly used for the gas-liquid contact and the reaction thereof, wherein a pack bed rotating at a high speed is used to increase the liquid-gas mass-transfer efficiency. Similar rotation pack beds can also be found in U.S. Pat. Nos. 4,382,045; 4,382,900; and 4,400,275.

In 1996,Jiann-Feng Chen et al. disclosed (CN1116185A) an ultra-gravity method for preparing an ultra fine powder of calcium carbonate, wherein a carbonization reaction performing in a reaction vessel is improved by using an ultra-gravity reaction device. Said method reduces the carbonization time and enables the particles becoming ultra-fine, where the particle size can be controlled at 10~100 nm with a uniform particle distribution.

In 2000, Jiann-Feng Chen et al. published (CN1258639A) a method for preparing an ultra fine powder of aluminum hydroxide by an ultra-gravity method, which comprises decomposing the carbon-containing compounds, and water-heating treatment. After the water-heating treatment, the particle size can be controlled at 1~5 nm, and a needle-like crystal with an aspect ratio of 5~100 can be obtained.

In 2001, Jiann-Feng Chen et al. published (CN1288856A) an ultra-gravity method for preparing an ultra fine powder of silicon dioxide, wherein an ultra-gravity reaction device is used to effectively reducing the carbonization time of water glass, thereby obtaining an ultra fine powder of silicon dioxide having a particle size of 15~30 nm.

In 2001, Han et al. published a water-heating method for preparing an ultra fine powder of ferric oxide (U.S. Pat. No. 6,203,774), which comprises dissolving α-FeOOH in ethanol, and using a water-heating method together with a habit modifier to control the crystal pattern of the ferrous oxide obtained.

The use of an ultra-gravity device (rotation pack bed) has the following disadvantages: (1) non-uniform mass transfer efficiency, with the efficiency gradually decreasing towards the outer periphery of the rotation bed; (2) easy to form a situation where the density of the packing near the outer periphery is higher than that of the portion near the rotation axis due to the centrifugal force; (3) the rotation pack bed having a complicated structure such that the bed is liable in losing its dynamic balance and causing a frequent shut-down for maintenance.

A primary objective of the present invention is to provide a reactor for producing ultra fine particles, which is free of the abovementioned disadvantages.

Another objective of the present invention is to provide a reactor for producing ultra fine particles, which has an enhanced mixing efficiency.

A further objective of the present invention is to provide a method for preparing ultra fine particles.

Figure 1:
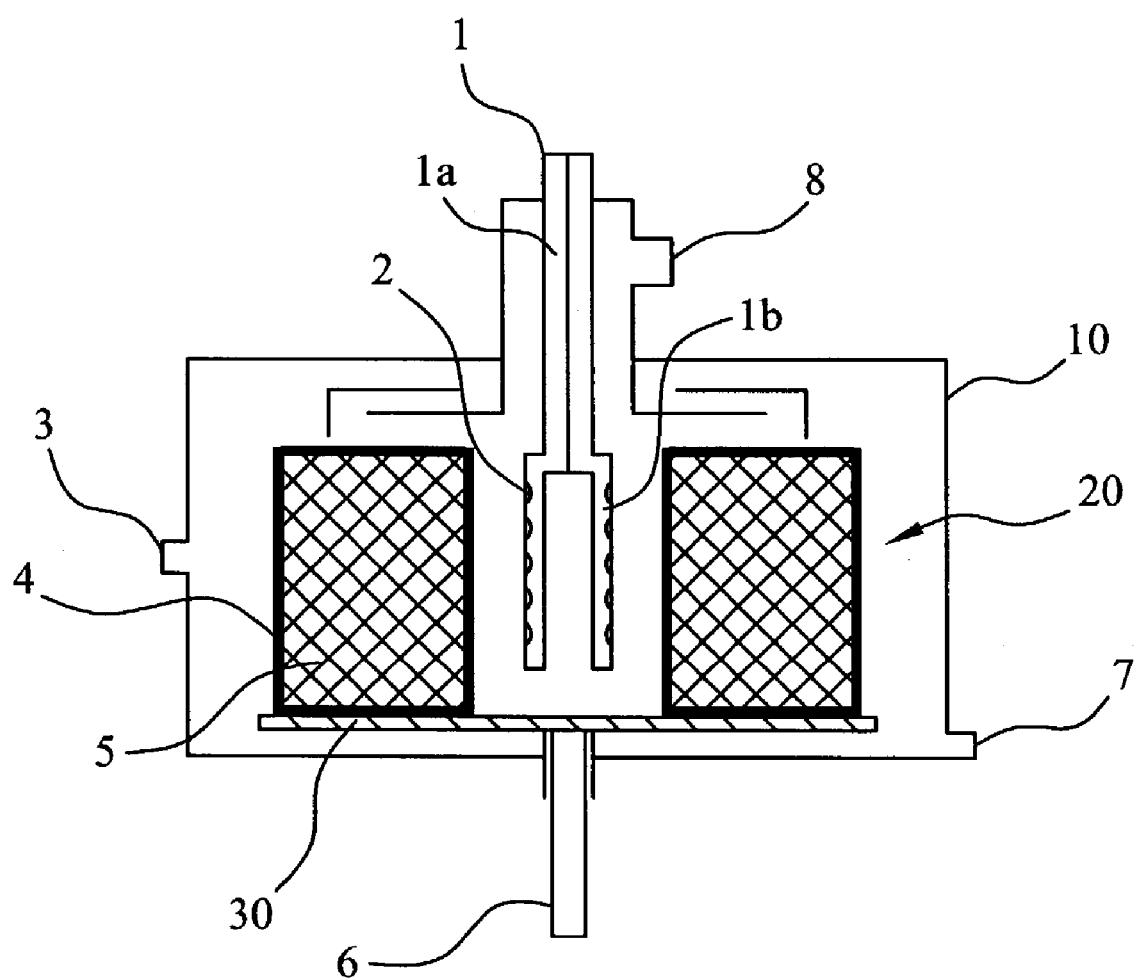
FIG. 1 is a schematic cross-sectional view of a high-shear, high-vortex reactor according to a first preferred embodiment of the present invention.

Legends:

10 . . . reaction chamber 1 . . . liquid inlet pipe 2 . . . perforation 3 . . . gas inlet 4 . . . external frame 5 . . . stainless steel screen 6 . . . rotation shaft 7 . . . reaction product outlet 8 . . . gas discharge pipe 20, 20', 20", 20a . . . porous rotors 30 . . . rotation table

DETAILED DESCRIPTION OF THE INVENTION

In a conventional ultra-gravity device, the gas-liquid contact and mass transfer are mainly carried out at the liquid films on the surface of the packing of the rotation pack bed. The mass transfer rate in this device is mainly determined by the viscosity of the fluid, and the specific surface area of the packing, etc. The ultra-gravity device is an improvement over the ordinary pack bed reactor. The present invention now discloses a novel high-shear, high-vortex reaction device, which is mainly characterized in using a plurality of porous rotors. The novel high-shear, high-vortex reaction device according to the present invention uses the porous rotors rotating at a high speed to disperse the liquid flown out of the shaft into tiny liquid droplets, so that a liquid-gas mass transfer occurs on the surfaces of the tiny droplets. The liquid surface area per unit volume generated by the tiny droplets is far larger than that of the liquid films on the surface of the packing. Therefore, the mass transfer rate can be further increased. Further, the reactants required for the growth of crystal are confined in the tiny droplets, so that the crystallization reaction is terminated as soon as any one of the reactants contained therein is consumed, thereby controlling the crystal particles in the nanometer level.

In addition to being suitable for a gas-liquid contact reaction, the reaction device according to the present invention is also suitable for a liquid-liquid reaction.

During the precipitation crystallization reaction, the crystal nucleation reaction and the crystal growth reaction are competing with each other. That is, at the same time when the reaction takes place, a certain degree of super-saturation occurs. At this time, the nucleation reaction starts to take place. After the initiation of the nucleation reaction, the crystal growth reaction also starts to take place. The faster the nucleation reaction, the more reactants are being consumed, and the concentration of the starting material for crystal growth is lower. As a result of the competitive reactions, the crystal growth reaction is inhibited, as well as the size of the crystal product, thereby achieving the production of ultra fine particles.

One way of achieving the aforesaid result includes reinforcing the degree of micro-mixing in the reaction device such that a majority of reactants are consumed by the nucleation reaction in a first place without excessive amounts o reactants for the crystal growth reaction.

The novel high-shear, high-vortex reaction device according to the present invention can achieve the aforesaid result using a physical means. In addition to increasing the micro-mixing efficiency, the repetitively cutting of the fine droplets by the rotating porous rotors also has the spatial effects of increasing the degree of micro-mixing and inhibiting the crystal growth reaction. Therefore, in comparison with the conventional ultra-gravity reaction device, the present invention not only improves the degree of micro-mixing, but also diminishes the defect that the packing material of the conventional ultra-gravity reaction device is vulnerable to rotation. Further, the tiny droplets formed in the reactor have the function as a minute reactor same as that in the conventional micro-emulsion process, thereby achieving a better control on the particle size and particle distribution of the crystals.

Figure 2:
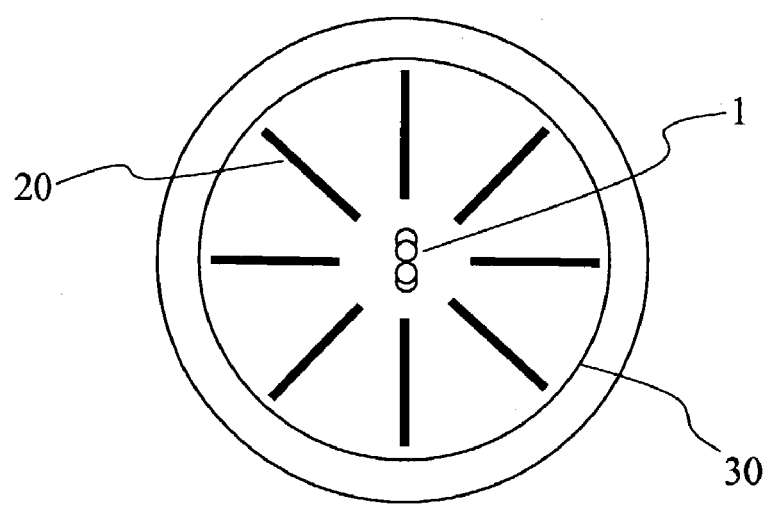
FIG. 2 is a schematic top plan view of a part of the reactor in FIG. 1.

FIGS. 1 and 2 show a high-shear, high-vortex reactor according to a first preferred embodiment of the present invention, wherein FIG. 2 shows the top plan view of a part of the reactor shown in FIG. 1. Said high-shear, high-vortex reactor comprises: an enclosed reaction chamber 10, two liquid inlet pipes 1, a gas inlet 3 located on the outer peripheral wall of said reaction chamber 10, eight porous rotors 20, a rotation table 30, a rotation shaft 6, a reaction product outlet 7 located on the outer peripheral wall of said reaction chamber 10 and near the bottom thereof, and a gas discharge pipe 8.

Said porous rotor 20 comprises a rectangular external frame 4 and a stainless steel screen 5 with a mesh number of 60–80 and supported on said external frame 4, wherein said external frame 4 is perpendicularly fastened to the upper surface of said rotation table 30. Said eight porous rotors 20 are radially relative to the rotation axis of said rotation shaft 6, and fastened to the upper surface of said rotation table 30 at an equal angular interval. In another preferred embodiment according to the present invention, said porous rotor comprises two perpendicular posts fastened to the upper surface of said rotation table, and an endless belt of a stainless steel screen stretched on said two perpendicular posts.

Said rotation table 30, through the rotation shaft 6 fastened to the lower surface thereof, is driven by an external motor (not shown in the figure) such that said eight porous rotors 20 rotate at a high speed around the rotation axis of said rotation shaft 6.

Each of the two liquid inlet pipes 1 comprises an inlet part 1a protruding from said reaction chamber 10, and a perforation part 1b surrounded by said eight rotors 20. Said perforation part 1b is provided with a plurality of perforations 2 facing said rotors 20, and said perforation part 1b is sealed at its bottom end.

Said gas discharge pipe 8 is connected to said reaction chamber 10 and is aligned with said rotation axis. Said gas discharge pipe 8 surrounds the inlet end part 1a of the two inlet pipes 1, thereby forming an annular passage for discharging the gas inside said reaction chamber 30.

When performing a gas-liquid contact, a liquid is introduced into said reaction chamber 10 through the top inlet of the inlet part 1a of said liquid inlet pipes 1, and, through said perforations 2, sprayed toward said porous rotors 20 into a reaction region of the reaction chamber 10, where the liquid is splashed by said porous rotors 20 and divided into fine droplets. The fine droplets contact and react with a reactant gas injected through the gas inlet 3. The non-gaseous reaction product flows out the reaction chamber 10 through the reaction product outlet 7, and the gaseous portion is discharged through the gas discharge pipe 8.

When performing a liquid-liquid contact, two different liquids are separately introduced into the reaction chamber 10 through the two liquid inlet pipes 1, and, through said perforations 2, separately sprayed toward said porous rotors 20 into the reaction region, where the liquids are splashed by said porous rotors 20 and divided into fine droplets, which contact and react with each other. The reaction product flows out through the reaction product outlet 7, and, if there is a formation of a gas, the gas is discharged through the gas discharge pipe 8.

Figure 3:
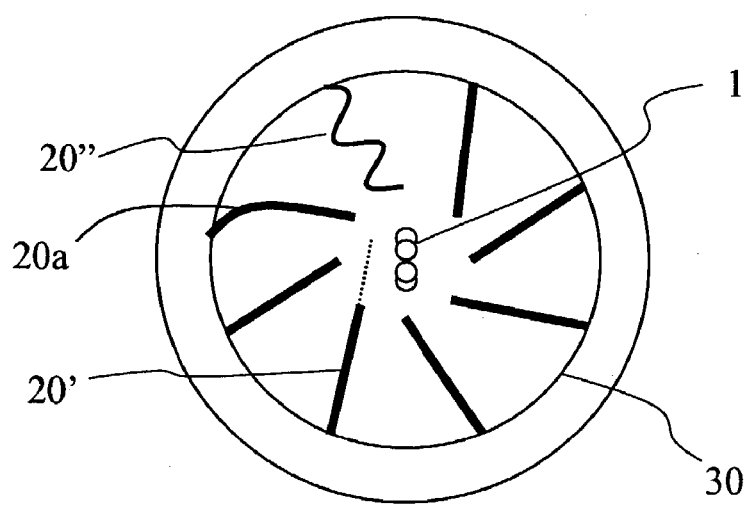
FIG. 3 is a schematic top plan viewing a part of another high-shear, high-vortex reactor according to a second preferred embodiment of the present invention.

The porous rotors 20 in the abovementioned example can have a wide variety of modifications including, but not limited to, the ones shown in FIG. 3: a porous rotor 20' being disposed on the rotation table 30 such that an imaginary plane (shown as a dot line) extending from the porous rotor 20' substantially deviates from said rotation axis; a corrugated porous rotor 20''; and a curved porous rotor 20a.

EXAMPLE 1

Comparison of the Degrees of Micro-mixing

In order to compare the degrees of micro-mixing between a high-shear, high-vortex reaction device according to the present invention and the conventional ultra-gravity reaction device, the present invention adopted the parallel competitive reactions between $H_2BO_3^-$, $I^-$ and $IO_3^-$ proposed by Fournier et al. in 1996. The dynamic reaction mechanism thereof is shown in the following:

$$H_2BO_3^- + H^+ \rightarrow H_3BO_3 \qquad (1)$$

$$5I^- + IO_3^- + 6H^+ \rightarrow 3I_2 + 3H_2O \qquad (2)$$

$$I^- + I_2 \rightarrow I_3^- \qquad (3)$$

The reaction formula (1) is a neutralization reaction with an extremely fast reaction rate, and the reaction formula (2) is a redox reaction also with a rather fast reaction rate. When the micro-mixing is near perfect, almost all the hydrogen ions are reacted with $H_3BO_3$, because the neutralization is very fast. As a result, there is no formation of $I_2$ and $I_3^-$. Therefore, a measurement on the variation of the concentration of $I_3^-$ in the solution can indicate the micro-mixing efficiency.

When $H_2BO_3^-$, $I^-$ and $IO_3^-$ are excessive, the yield of the reaction formula (2) could be defined as:

$$Y = \frac{2(n_{I_2} + n_{I_3^-})}{(nH^+)_0} \qquad (4)$$

When the micro-mixing is infinitely slow, the yield of the reaction formula (2) can be defined as:

$$Y_{ST} = \frac{6(IO_3^-)_0/(H2BO_3^-)_0}{6(IO_3^-)_0/(H2BO_3^-)_0 + 1} \quad (5)$$

Therefore, the mixing index can be defined as:

$$X_S = \frac{Y}{Y_{ST}} \quad (6)$$

In a perfect mixing, Xs=0; and in an extremely poor mixing, Xs=1. In an ordinary CSTR, Xs is between 0.15~0.7; Xs is between 0.02~0.7 for a static mixer; and Xs is between 0.01~0.8 for an ultrasonic mixing.

The high-shear, high-vortex reactor of the invention used in this example has 6 sheets of metal screen blade with a mesh number of 60~80. The blade has a radial length of 4 cm, and an axial height of 2 cm. The ultra-gravity rotation pack bed reactor used in this example as an control has an inside diameter of 2 cm, an outside diameter of 4 cm, and an axial height of 2 cm. The packing used is an acrylic bead with a diameter of 2 mm.

Two feed liquids were used in this example, where the liquid A contained the following reactants:

[KIO$^{3-}$]: 3.8×10$^{-4}$ (mol/l);

[KI]: 1.9×10$^{-3}$ (mol/l);

[H$_2$BO$_3$]: 4.7×10$^{-2}$ (mol/l); and

[H$^+$]: 3.3×10$^{-2}$ (mol/l), and the liquid B was an aqueous solution of sulfuric acid as a source of hydrogen ions.

Table 1 shows the results of mixing index between the high-shear, high-vortex reactor according to the present invention and the conventional rotation pack bed reactor operating at various conditions.

TABLE 1

Experimental results of mixing index at various operation conditions

| Flow ratio | Flow rate (ml/min) | Rotation speed (rpm) | Xs (present invention) | Rotation speed (rpm) | Xs (ultra-gravity) |
|---|---|---|---|---|---|
| 11.7 | V$_{tot}$: 260 | 1184 | 0.0141 | 1200 | 0.0724 |
|  | V$_A$: 240 | 1950 | 0.0082 | 1800 | 0.0581 |
|  | V$_B$: 20.5 | 2360 | 0.0070 | 2300 | 0.0561 |
| 11.1 | V$_{tot}$: 454 | 1184 | 0.0159 | 1200 | 0.0675 |
|  | V$_A$: 416 | 1950 | 0.0080 | 1800 | 0.0536 |
|  | V$_B$: 37.5 | 2360 | 0.0070 | 2300 | 0.0478 |
| 11.0 | V$_{tot}$: 668 | 1184 | 0.0209 | 1200 | 0.0698 |
|  | V$_A$: 612 | 1950 | 0.0113 | 1800 | 0.0531 |
|  | V$_B$: 55.6 | 2360 | 0.0112 | 2300 | 0.0445 |
| 64.9 | V$_{tot}$: 422 | 1184 | 0.0619 | 1200 | 0.1214 |
|  | V$_A$: 416 | 1950 | 0.0420 | 1800 | 0.1017 |
|  | V$_B$: 6.4 | 2360 | 0.0434 | 2300 | 0.0845 |

It can be seen from Table 1 that, under various operation conditions, the mixing index of the high-shear, high-vortex reactor according to the present invention ranges from about 0.007 to about 0.06, which is significantly lower than that of the above-mentioned CSTR, static mixer, and ultrasonic mixing. This indicates that a reactor according to the present invention has a very high micro-mixing efficiency. Comparing to the conventional rotation pack bed ultra-gravity reaction device, the mixing index of the high-shear, high-vortex reactor according to the present invention is about ½~1/10 thereof. The micro-mixing effect of the high-shear, high-vortex reaction device of the present invention is superior that that of the conventional rotation pack bed reactor.

The main differences between the high-shear, high-vortex reactor according to the present invention and the conventional rotation pack bed reactor are listed in Table 2:

TABLE 2

| Comparison items | The conventional rotation pack bed reactor | High-shear, high-vortex reactor of the present invention |
|---|---|---|
| Method of mixing for the reaction material | Rotation pack bed | Porous rotors |
| Mixing index, Xs | 0.014 ~ 0.12 | 0.007 ~ 0.060 |
| Mechanical structure | Complex | Simple, easy for production in large diameter |
| Stability | Pack bed being easy to deform and lose its dynamic balance | Rotors being evenly fastened and not liable to lose their dynamic balance |
| Maintenance | Rotation pack bed being difficult to be cleaned | Rotors being easy to be wiped and cleaned |

EXAMPLE 2

Preparation of Ultra Fine Powder of Ferric Oxide

Aqueous solutions of same equivalents (0.1 N/mole) of FeSO$_4$ and NH$_4$OH were separately placed in two different inlet tanks, and, through two different inlet pipes, were simultaneously injected at a flow rate of 300 ml/min into the high-shear, high-vortex reactor of the present invention used in Example 1, which was operated at a rotation speed of 1800 rpm, thereby obtaining a product mixture containing a fine powder of FeOOH. The obtained product mixture was injected at a flow rate of 500 ml/min into an identical high-shear, high-vortex reactor of the present invention, which was operated at a rotation speed of 1800 rpm, for contacting air at 70° C. and under atmospheric pressure, which was introduced to the reactor at a flow rate of 10 l/min, so that an oxidation reaction oxidizing the fine particles of FeOOH into Fe$_3$O$_4$ was carried out. The product mixture containing fine particles of Fe$_3$O$_4$ was collected in a tank, and then was subjected to a water heating treatment at 70° C. under atmospheric pressure, thereby obtaining fine particles of Fe$_2$O$_3$ with a particle size less than 30 nm.

EXAMPLE 3

Preparation of Fine Particles of Al(OH)$_3$

Aqueous solutions of same equivalents (0.1 N/mole) of NaAlO$_2$ and Al$_2$(SO$_4$)$_3$ were separately placed in two different inlet tanks, and, through two different inlet pipes, were simultaneously injected at a flow rate of 300 ml/min into the high-shear, high-vortex reactor of the present invention used in Example 1, which was operated with a rotation speed of 1800 rpm, to react at 70° C. under atmospheric pressure, thereby obtaining a fine powder of Al(OH)$_3$ with a particle size less than 20 nm.

The invention claimed is:

1. A reactor for producing ultra fine particles comprising:
a reaction chamber;
a plurality of spaced porous structures located in said reaction chamber, wherein said plurality of porous structures rotate around an axis, when said reactor is under operation, and each of said plurality of porous structures comprises portions having different angular speeds relative to said axis; and
a feed means for separately injecting one or more feed liquids in a direction from said axis towards said plurality of porous structures, such that said one or more feed liquids are splashed and divided by said plurality of porous structures into fine droplets, when said reactor is under operation and said one or more feed liquids are introduced into said feed means;
wherein said feed means comprises two or more inlet pipes parallel to said axis, and each of said two or more inlet pipes comprises an inlet end adapted to connect to a feed liquid; a sealed end opposite to said inlet end; and a perforation part between said inlet end and said sealed end, and being surrounded by said plurality of porous structures, said perforation part being provided with a plurality of perforations along said axis facing said plurality of porous structures.

2. The reactor as claimed in claim 1, wherein said plurality of porous structures comprise 2–8 porous structures which are spaced at equal angle around said axis.

3. The reactor as claimed in claim 2 further comprising a rotation table, a surface of said rotation table being fastened with said plurality of porous structures, while another surface thereof being installed with a rotation shaft perpendicular to said rotation table, wherein each of said plurality of porous structure is substantially perpendicular to the surface of said rotation table, and a portion of said rotation shaft extends out from said reaction chamber and said portion is adapted to be driven by a motor for rotating said rotation shaft around said axis.

4. The reactor as claimed in claim 3, wherein said plurality of porous structures are radially fastened to the surface of said rotation table relative to said axis.

5. The reactor as claimed in claim 3, wherein an imaginary plane extending from said porous structure substantially deviates from said axis.

6. The reactor as claimed in claim 3, wherein said porous structure is planar, corrugated, or curved.

7. The reactor as claimed in claim 6, wherein said porous structure is planar.

8. The reactor as claimed in claim 2, wherein said porous structure comprises a metal screen, a plate having sieve holes thereon, or a porous inorganic or polymer material capable of allowing a liquid penetrating through.

9. The reactor as claimed in claim 1, wherein said porous structure comprises a metal screen.

10. The reactor as claimed in claim 1, wherein said feed means comprises two inlet pipes, and the inlet ends thereof being adapted to separately connect to two different feed liquids.

11. The reactor as claimed in claim 1, wherein said feed means comprises an inlet pipe.

12. The reactor as claimed in claim 1, further comprising a gas inlet located on an outer peripheral wall of said reaction chamber; and a gas discharge pipe connected to said reaction chamber at a location near said axis, wherein said gas inlet is used to introduce a feed gas into said reaction chamber, and said gas discharge pipe is used to discharge a gas from said reaction chamber.

13. The reactor as claimed in claim 1, further comprising a gas inlet located on an outer peripheral wall of said reaction chamber; and a gas discharge pipe connected to said reaction chamber at a location near said axis, wherein said gas inlet is used to introduce a feed gas into said reaction chamber, and said gas discharge pipe surrounds a part of said one or more inlet pipes extending out from said reaction chamber so as to form an annular passage for discharging a gas in said reaction chamber.

14. The reactor as claimed in claim 1 further comprising a reaction product outlet located on an outer peripheral wall of said reaction chamber, said reaction product outlet being installed at a location so that the reaction product formed in said reaction chamber can be discharged out of said reaction chamber from said reaction product outlet by gravity.

* * * * *